(12) United States Patent
Koh et al.

(10) Patent No.: US 12,101,420 B2
(45) Date of Patent: Sep. 24, 2024

(54) MOBILE TERMINAL

(71) Applicant: LG ELECTRONICS INC., Seoul (KR)

(72) Inventors: Sunggyu Koh, Seoul (KR); Minjong Lee, Seoul (KR); Jongkyu Ju, Seoul (KR); Sanghyuk Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 336 days.

(21) Appl. No.: 17/621,954

(22) PCT Filed: Jul. 8, 2019

(86) PCT No.: PCT/KR2019/008351
§ 371 (c)(1),
(2) Date: Dec. 22, 2021

(87) PCT Pub. No.: WO2021/006371
PCT Pub. Date: Jan. 14, 2021

(65) Prior Publication Data
US 2022/0263930 A1    Aug. 18, 2022

(51) Int. Cl.
*H04M 1/02* (2006.01)

(52) U.S. Cl.
CPC ....... *H04M 1/0216* (2013.01); *H04M 1/0268* (2013.01); *H04M 2201/38* (2013.01)

(58) Field of Classification Search
CPC .. H04M 1/0216; H04M 1/022; H04M 1/0268; H04M 2201/38
USPC ...................................... 455/575.3
See application file for complete search history.

(56) References Cited

U.S. PATENT DOCUMENTS

| | | | |
|---|---|---|---|
| 9,348,450 B1* | 5/2016 | Kim | H04M 1/0268 |
| 10,585,459 B2* | 3/2020 | Chen | G06F 1/1656 |
| 2019/0297176 A1* | 9/2019 | Lee | G06F 3/016 |
| 2020/0050318 A1* | 2/2020 | Ure | H05K 5/0017 |
| 2020/0081495 A1* | 3/2020 | Lin | G06F 1/1681 |
| 2020/0383219 A1* | 12/2020 | Hale | G06F 1/1641 |
| 2021/0368032 A1* | 11/2021 | Liao | G06F 1/1681 |
| 2022/0061174 A1* | 2/2022 | Xie | G06F 1/1652 |
| 2022/0116489 A1* | 4/2022 | Nagai | H04M 1/022 |
| 2022/0197581 A1* | 6/2022 | Lee | G06F 9/50 |
| 2022/0272185 A1* | 8/2022 | Ju | G06F 1/1681 |
| 2023/0185338 A1* | 6/2023 | Seo | G06F 1/1652 |
| | | | 361/679.28 |

FOREIGN PATENT DOCUMENTS

| | | |
|---|---|---|
| KR | 10-1452871 B1 | 10/2014 |
| KR | 10-2016-0083608 A | 7/2016 |
| KR | 10-1754584 B1 | 7/2017 |
| KR | 10-2017-0116858 A | 10/2017 |
| WO | WO 2017/201097 A1 | 11/2017 |
| WO | WO 2018/144001 A1 | 8/2018 |

* cited by examiner

*Primary Examiner* — Tan H Trinh
(74) *Attorney, Agent, or Firm* — Birch, Stewart, Kolasch & Birch, LLP

(57) ABSTRACT

The present invention provides a mobile terminal comprising: a pair of bodies for supporting a flexible display panel; a hinge part for connecting the pair of bodies so as to be foldable; and an elastic metal layer which is provided on the rear surface of the flexible display panel and passes through a curvature forming part corresponding to an area in which the hinge part is provided on the flexible display panel.

18 Claims, 8 Drawing Sheets

(a)

(b)

(a)

(b)

MOBILE TERMINAL

CROSS REFERENCE TO RELATED APPLICATIONS

This application is the National Phase of PCT International Application No. PCT/KR2019/008351, filed on Jul. 8, 2019, which is hereby expressly incorporated by reference into the present application.

TECHNICAL FIELD

The present disclosure relates to a mobile terminal, and more particularly, to a foldable mobile terminal applicable to a technical field of forming a single curvature radius by a flexible display panel when the foldable mobile terminal is folded.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In addition, a mobile terminal may transceive information with an external device over shirt-range communication technologies such as Bluetooth™, Radio Frequency Identification (RFID), Infrared Data Association (IrDA). Ultra Wideband (UWB), ZigBee, Near Field Communication (NFC), Wireless Universal Serial Bus (Wireless USB) and the like.

A mobile terminal has a limited size in consideration of portability. As a size of a mobile terminal is limited, it may be difficult to provide a wide screen to a user through a display provided to the mobile terminal. Accordingly, recently, the development of a foldable mobile terminal that provides a larger screen to a user while increasing portability of the mobile terminal is in progress.

A foldable mobile terminal includes a flexible display panel folded together with a body. There is a problem in that wrinkles are formed on the flexible display panel when the radius of curvature is not uniformly formed in the process of folding the flexible display panel together with the body.

DISCLOSURE OF THE INVENTION

Technical Tasks

One technical task of the present disclosure is to prevent wrinkles from occurring on a flexible display panel in a manner that the flexible display panel included in a foldable mobile terminal forms a uniform curvature radius in response to a folding mechanism.

Technical Solutions

In one technical aspect of the present disclosure, provided is a mobile terminal including a pair of bodies supporting a flexible display panel, a hinge part connecting a pair of the bodies to perform a folding mechanism, and an elastic metal layer provided to a backside of the flexible display panel and passing through a curvature forming part corresponding to a region having the hinge part provided thereto in the flexible display panel.

The elastic metal layer may support the curvature forming part to form a uniform curvature radius in response to the folding mechanism of a pair of the bodies.

The elastic metal layer may have a restoring force corresponding to a minimum curvature radius formed by the curvature forming part.

The elastic metal layer may include shape memory alloy or amorphous metal.

The elastic metal layer may include Nitinol or Zr-based amorphous metal.

The hinge part may include a chain structure formed in a manner that a plurality of components are axially-coupled continuously and may support the curvature forming part through the chain structure.

A plurality of the components in the chain structure may have the same width.

The chain structure may support the curvature forming part to form a uniform curvature radius through an external force provided by the elastic metal layer in response to the folding mechanism of a pair of the bodies.

The chain structure may include a pair of sliding members adjusting a space between the chain structure and a pair of the bodies in response to the folding mechanism of a pair of the bodies.

A pair of the sliding members may include first elastic members at end portions thereof so as to be elastically supported by a pair of the bodies, respectively.

The hinge part may include a pair of support members supporting the chain structure in an unfolded state of a pair of the bodies.

One ends of a pair of the support members may contact or cross with each other in the unfolded state of a pair of the bodies.

The hinge part may include a hinge cover preventing the chain structure from being exposed in response to the folding mechanism of a pair of the bodies and forming a receiving space having the curvature forming part inserted therein or withdrawn therefrom.

To prevent the folding mechanism of a pair of the bodies from being interrupted when one ends of a pair of the support members contact with a topside of the hinge cover, a pair of the support members may include second elastic members provided to the other ends thereof so as to be elastically supported by a pair of the bodies, respectively.

The hinge cover may include fixed recesses having one ends of a pair of the support members inserted therein, respectively in a folded state of a pair of the bodies.

Advantageous Effects

Effects of a mobile terminal according to the present disclosure are described as follows.

The present disclosure may prevent a flexible display panel from being wrinkled due to an irregular curvature radius of the flexible display panel to respond to a folding mechanism of a foldable mobile terminal.

The present disclosure may prevent a flexible display panel from being wrinkled in a manner of varying a length of the flexible display panel in response to a folding mechanism of a foldable mobile terminal.

The present disclosure may prevent a flexible display panel from being wrinkled in a manner of supporting a curvature forming part of the flexible display panel not to droop in an unfolded state of a foldable mobile terminal.

The present disclosure may provide a structure of simply fixing a folded state of a foldable mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE FOR INVENTION

Figure 1:
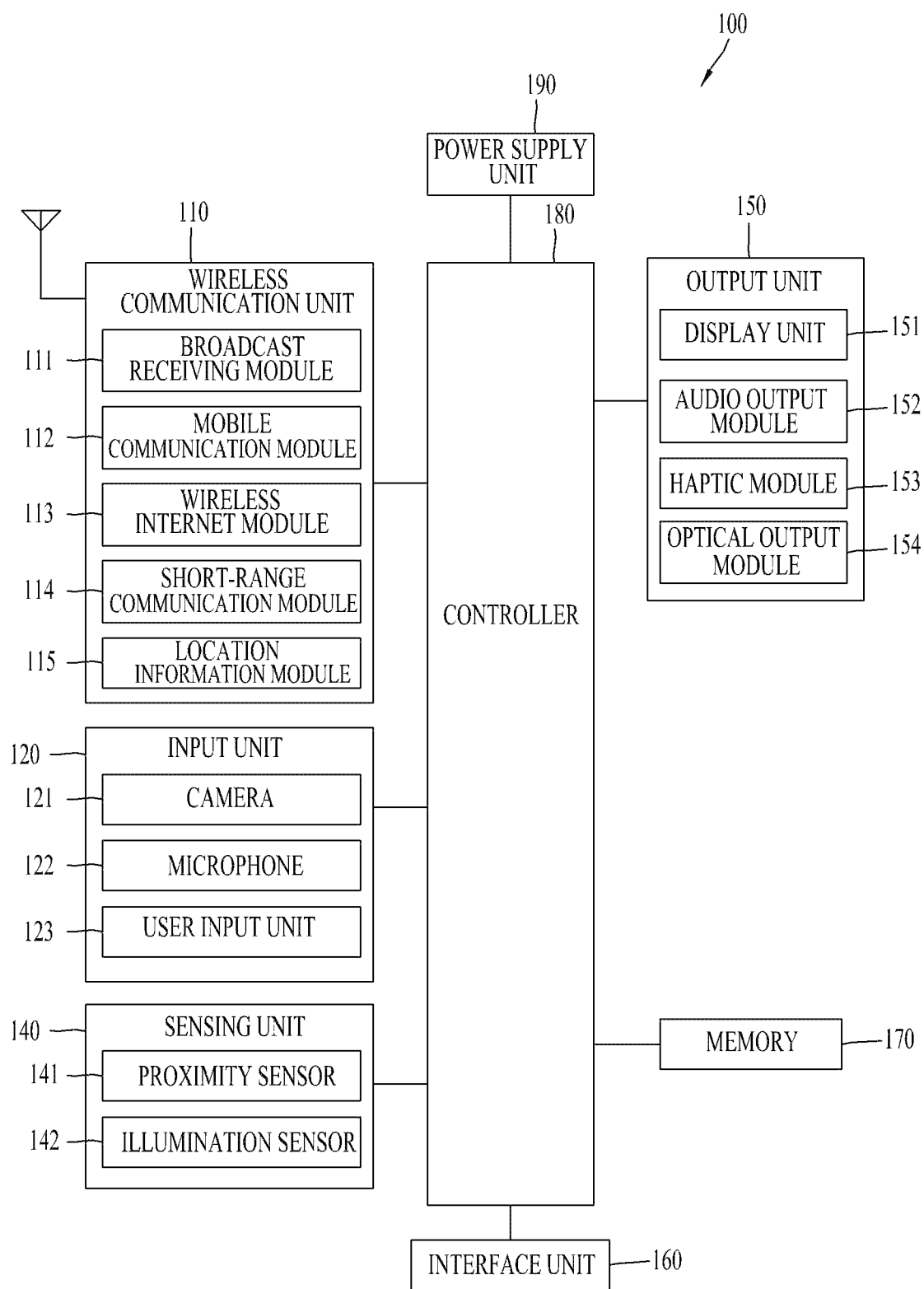
FIG. 1 is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1 is not a requirement, and that greater or fewer components may alternatively be implemented than the components listed above.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed as a user's control command.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE) LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, fix example, WiBro, HSDPA, HSUPA, GSM, CDMA, WCDMA, LTE. LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller ISO, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
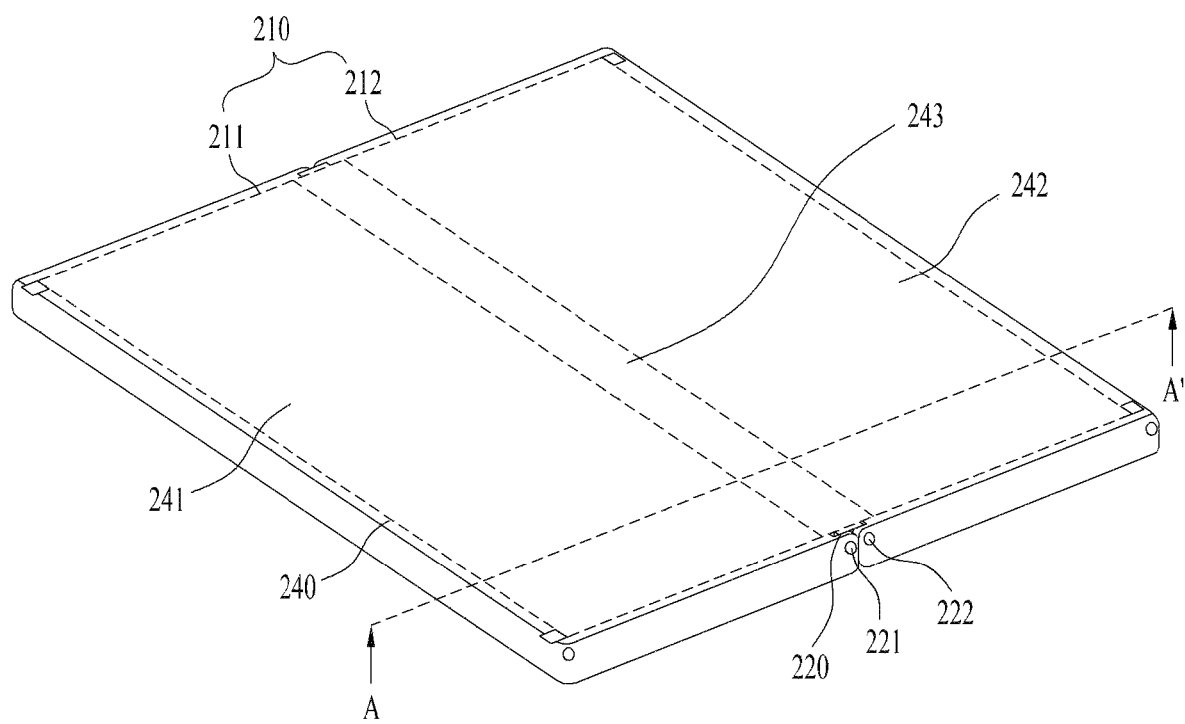
FIG. 2 is a perspective diagram of a foldable mobile terminal related to the present disclosure, viewed in one direction.

FIG. 2 is a perspective diagram of a foldable mobile terminal related to the present disclosure, viewed in one direction.

A mobile terminal of the present disclosure may include a pair of bodies 210 including a first body 211 and a second body 212 and a hinge part 220 provided between the first body 211 and the second body 12 to connect a pair of the bodies 210 together by a folding mechanism.

A pair of the bodies 210 of the present disclosure may support a flexible display panel 240, Specifically, the flexible display panel 240 of the present disclosure may include a first region 241 supported by the first body 211, a second region 242 supported by the second body 212, and a third region 243 provided between the first region 241 and the second region 242. Here, the third region 243 is a region provided with the hinge part 220 in the flexible display panel and may include a curvature forming part having a shape changed in response to the folding mechanism of a pair of the bodies 210.

The present disclosure intends to provide a structure of preventing wrinkles in a manner that the curvature forming part forms a uniform curvature in response to the folding mechanism. Specifically, the curvature forming part may form a uniform curvature radius in response to a folding angle of a pair of the bodies 210. In addition, the curvature radius formed by the curvature forming part of the present disclosure may be uniform along a folding axis.

Figure 3:
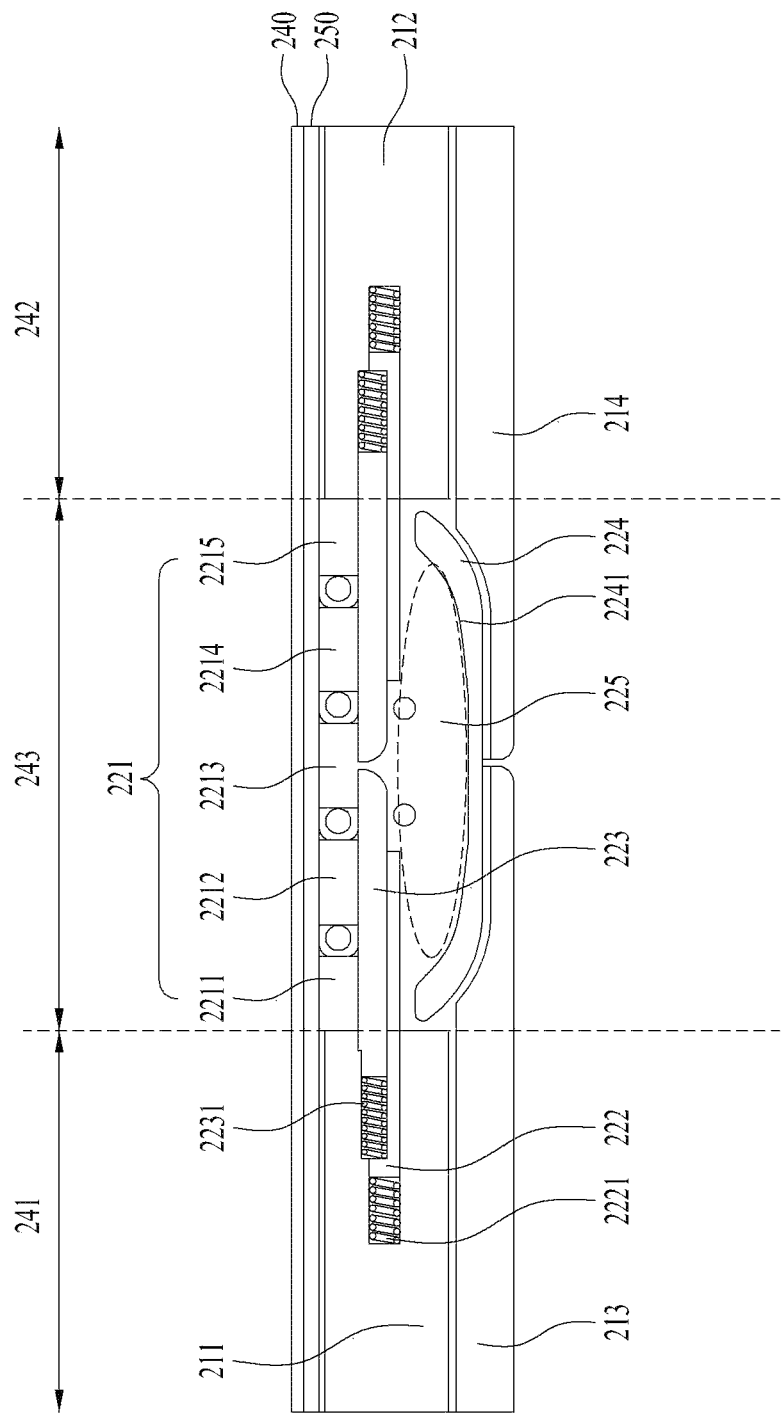
FIG. 3 is a cross-sectional diagram of some components of a foldable mobile terminal related to the present disclosure, viewed in a direction A-A' of FIG. 2.

FIG. 3 is a cross-sectional diagram of some components of a foldable mobile terminal related to the present disclosure, viewed in a direction A-A' of FIG. 2.

The present disclosure may include an elastic metal layer 250 provided to a backside of the flexible display panel 240 over the curvature forming part corresponding to a region provided with the hinge part in the flexible display panel.

Here, the curvature forming part may correspond to the third region 243 between the first region 241 supported by the first body 211 and the second region 242 supported by the second body 212 in the flexible display panel 240. The first region 241 and the second region 242 may be the regions maintaining a planar state irrespective of the folding mechanism of a pair of the bodies 211 and 212, and the third region 243 may be the region changing in shape in response to the folding mechanism.

The elastic metal layer 250 of the present disclosure may support the curvature forming part of the flexible display panel 240 to form a uniform curvature radius in response to the folding mechanism to correspond to the folding mechanism of a pair of the bodies 211 and 212.

The hinge part of the present disclosure includes a chain structure 221 formed by axially-coupling a plurality of components 2211 to 2215 continuously and may support the curvature forming part through the chain structure 221. Specifically, the chain structure 221 of the present disclosure may support the elastic metal layer 250 to form a uniform curvature radius through an external force provided by the elastic metal layer 250 in response to the folding mechanism of a pair of the bodies 211 and 212. The principle of forming the uniform curvature radius through the chain structure 221 and the elastic metal layer 250 will be described in detail with reference to FIG. 4 and FIG. 5.

The chain structure 221 of the present disclosure may include a pair of sliding members 222 adjusting a space between the chain structure 221 and a pair of the bodies 211 and 212 in response to the folding mechanism of a pair of the bodies 211 and 212. A pair of the sliding members 222 may be elastically supported by a pair of the bodies 211 and 212 in a manner of including first elastic members 2221 at end portions, respectively.

One object of the sliding member 222 of the present disclosure is to compensate the length of the flexible display panel 240 in response to the folding mechanism of a pair of the bodies 211 and 212. When a pair of the bodies 211 and 212 are folded, a width length of a surface provided with the flexible display panel 240 may be decrease. If the width length of the surface provided with the flexible display panel 240 decreases, wrinkles may occur in the flexible display panel 240. The present disclosure may uniformly maintain the width length of the surface provided with the flexible display panel 240 in response to the folding mechanism through the sliding member 222. For example, when a pair of the bodies 211 and 212 are folded, the sliding member 222 moves in a direction of a folding axis, thereby preventing the width length of the surface provided with the flexible display panel 240 from decreasing.

The present disclosure may form an inner space 225 through a hinge cover 224, so that the curvature forming part of the flexible display panel 240 is inserted in or withdrawn from the inner space 225. The hinge cover 224 is provided between a pair of the bodies 211 and 212, and may prevent the chain structure 221 from being externally exposed in response to the folding mechanism of a pair of the bodies 211 and 212. In some cases, a pair of the bodies 211 and 212 may include a pair of rear covers 2132 and 214 on their backsides, respectively to prevent the hinge cover 224 from being exposed in an unfolded state of a pair of the bodies 211 and 212.

The present disclosure may prevent the chain structure 221 from sagging in the unfolded state of a pair of the bodies 211 and 212 through a pair of support members 223. A pair of the support members 223 may support the chain structure 221 in a manner that one end portions thereof contact or cross with each other in the unfolded state of a pair of the bodies 211 and 212, and the other portions may be elastically supported by second elastic members 2231, respectively. A pair of the support members 223 are elastically supported through the second elastic member 2231, which is because the inner space 225 formed by the hinge cover 224 may be limited. A mechanism of the support member 223 in response to the folding mechanism of a pair of the bodies 211 and 212 will be described in detail with reference to FIG. 6 and FIG. 7.

Figure 4:
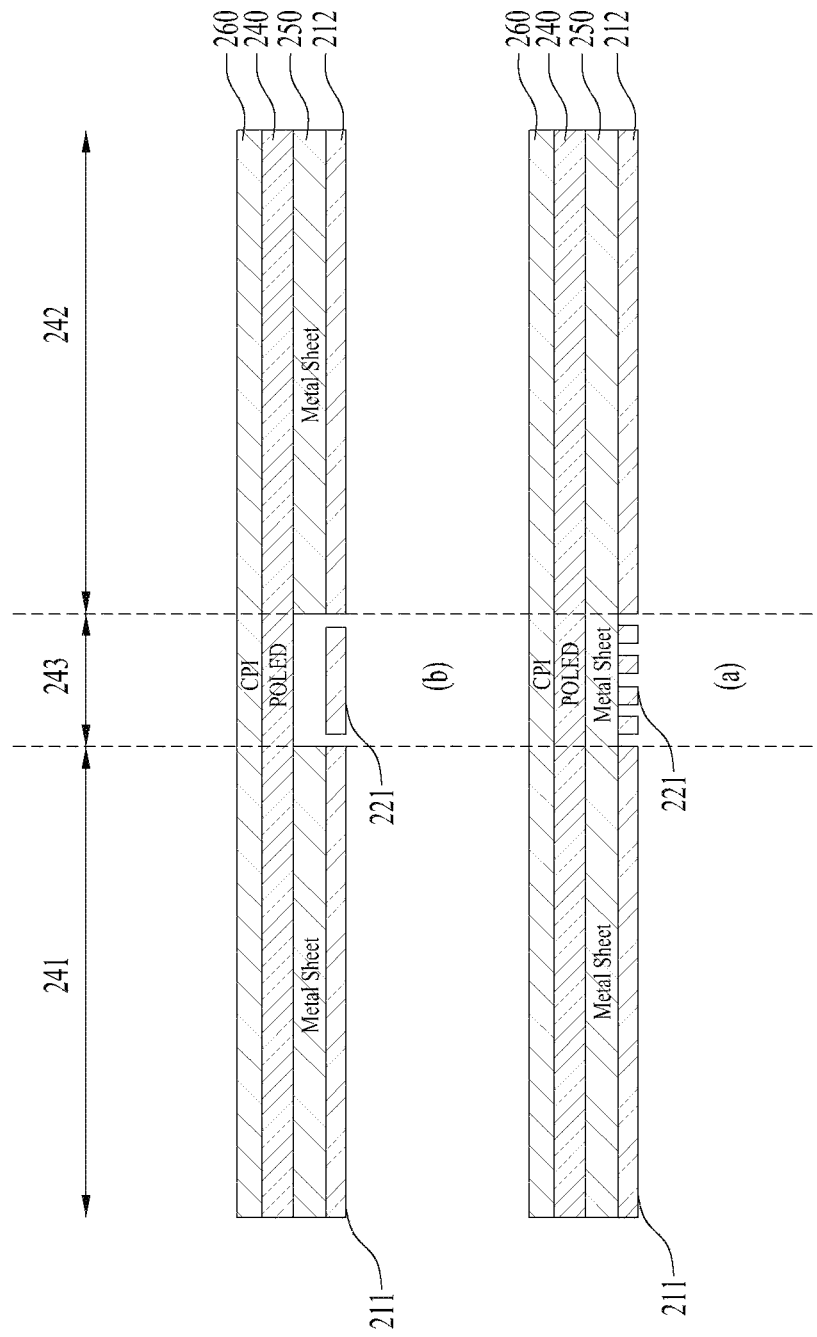
FIG. 4 is a conceptual diagram showing the relation between a flexible display panel and adjacent configuration of the present disclosure.

FIG. 4 is a conceptual diagram showing the relation between a flexible display panel and adjacent configuration of the present disclosure.

The flexible display panel 240 of the present disclosure may include the first region 241 supported by the first body 211, the second region 242 supported by the second body 212, and the third region 243 provided between the first region 241 and the second region 242. The third region 243 may be the curvature forming part forming a curvature in response to the folding mechanism of a pair of the bodies 211 and 212. In addition, the third region 243 of the flexible display panel 240 may be provided to a location corresponding to the hinge part.

A front side of the flexible display panel 240 of the present disclosure may be protected by a protective sheet 260 and its backside may be supported by a metal sheet. Yet the present disclosure differs from the related art in the metal sheet supporting the backside of the flexible display panel 240, which be described as follows.

First, a conventional support structure of the flexible display panel 240 is described with reference to FIG. 4 (a). Regarding a conventional foldable mobile terminal, the first region 241 and the second region 242 in the flexible display panel 240 are provided with a metal layer 250' only, and the third region forming a curvature is not supported by the metal layer 250'. In some cases, although the metal layer 250' may support a portion of the third region 243, the metal layer 250' of the conventional foldable mobile terminal is cut in the third region 243. Namely, the metal layer 250' does not interrupt a mechanism that a pair of the bodies 211 and 212 are folded in a manner of being connected to the hinge part 220. Yet, in this case, an empty space is generated from the backside of the third region 243 of the flexible display panel 240 and there is no structure for supporting the third region 243 uniformly, thereby causing a problem that wrinkles occur in the third region 243. In addition, foreign substance enters the empty space of the backside of the third region, thereby causing a problem that the flexible display panel 240 protrudes from a front side.

Regarding the structure of the present disclosure, unlike the conventional structure, as shown in FIG. 4 (b), the elastic metal layer 250 is provided to the backside of the flexible display panel 240 and passes through the third region 243 seamlessly. The elastic metal layer 250 of the present disclosure forms a curvature together with the flexible display panel 240, and may support the third region 243 to form a uniform curvature radius.

The elastic metal layer 250 of the present disclosure may have a restoring force corresponding to a minimum curvature radius formed by the curvature forming part. Namely, the elastic metal layer 250 may have elasticity of restoring to an original state without shape deformation at a radius greater than the minimum curvature radius formed by the curvature forming part. Here, the minimum curvature radius may be determined by the internal structure of the foldable mobile terminal of the present disclosure. In some cases, the minimum curvature radius formed by the flexible display panel 240 may be determined in consideration of the restoring force of the elastic metal layer 250.

The elastic metal layer 250 of the present disclosure may include shape memory alloy or amorphous metal. Specifically, the elastic metal layer 250 may include Nitinol or Zr-based amorphous metal.

The elastic metal layer 250 of the present disclosure may implement a smaller minimum curvature radius formed by the flexible display panel 240 if a restoring force increases more. In case that a minimum curvature radius is small, since a space required for a folded foldable mobile terminal is small, a foldable mobile terminal in smaller size can be implemented. Therefore, the elastic metal layer 250 used in the present disclosure is non-limited by the above metal but may use metal substance of high elasticity.

Figure 5:
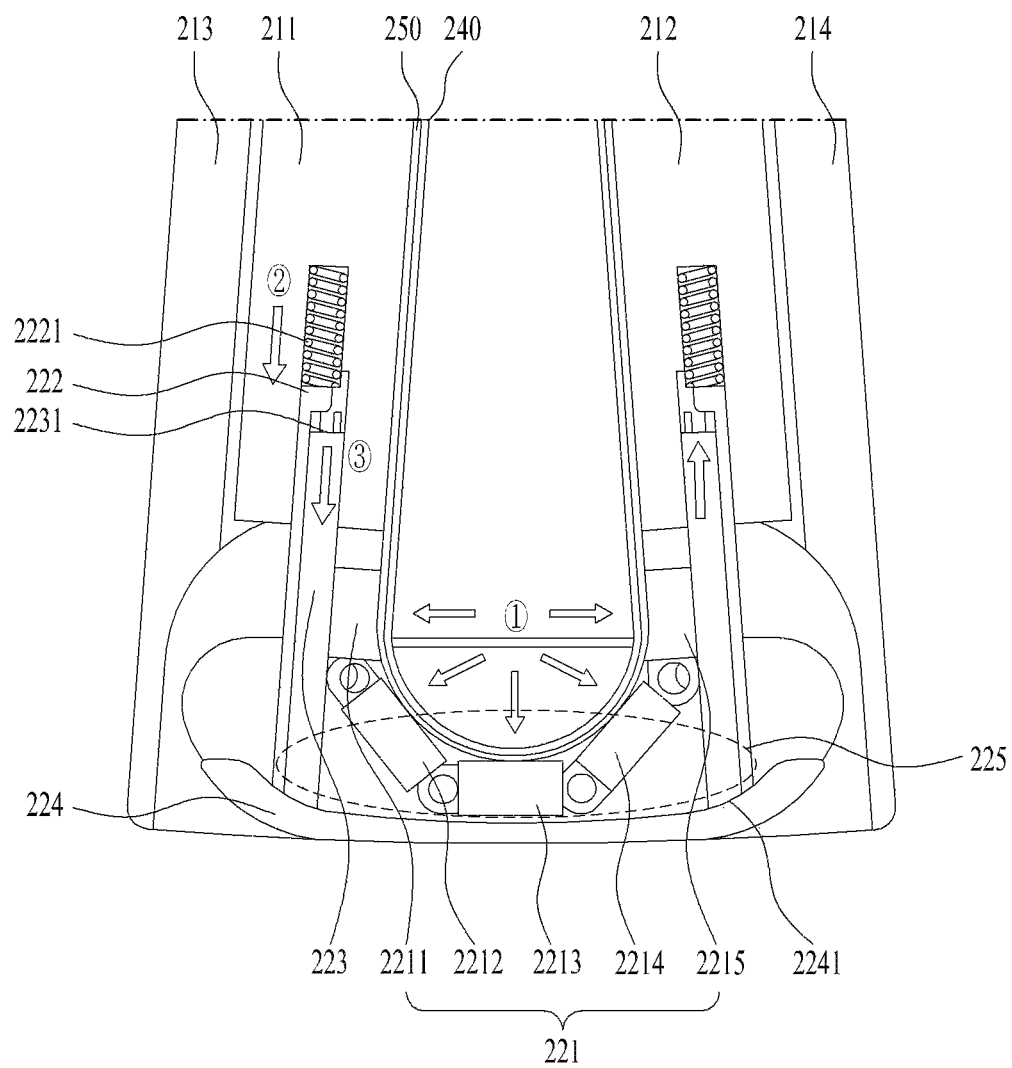
FIG. 5 is a diagram to describe the principle for a flexible display panel of the present disclosure to form a uniform curvature radius.

FIG. 5 is a diagram to describe the principle for a flexible display panel of the present disclosure to form a uniform curvature radius.

The present disclosure may support the flexible display panel 240 to have a uniform curvature through the elastic metal layer 250 passing through the curvature forming part in response to the folding mechanism of a pair of the bodies 211 and 212, Specifically, the present disclosure may support the flexible display panel 240 to form a uniform curvature through the elastic metal layer 250 and the chain structure 221 of the hinge part.

The elastic metal layer 250 of the present disclosure may be provided to the backside of the flexible display panel 240 to pass through the curvature forming part. The elastic metal layer 250 of the present disclosure may provide a restoring force ① to return to an original state to the chain structure 221 when a pair of the bodies 211 and 212 are folded. The chain structure may support the curvature forming part of the flexible display panel 240 to form a uniform curvature using the restoring force ① provided by the elastic metal layer 250, Specifically, the restoring force ① of the elastic metal layer 250 may work as an external force enabling a plurality of the components 2211 to 2215 configuring the chain structure 221 to enclose the curvature forming part to form a uniform curvature radius.

The chain structure 221 of the present disclosure may include the sliding member 222 moving in response to the folding mechanism of a pair of the bodies 211 and 212. The present disclosure may prevent the flexible display panel 240 from being wrinkled due to the shortage of the length for forming a curvature through the movement of the sliding member 222. The elastic metal layer 250 of the present disclosure may provide an external force for moving the sliding member 222, Yet, in some cases, the sliding member 222 may be elastically supported by having the first elastic member 2221 provided to an end portion of the sliding member 222. A repulsive force ② provided by the first elastic member 221 may supplement the external force provided by the elastic metal layer 250.

Preferably, the chain structure 221 of the present disclosure is not fixed despite supporting the curvature forming part of the flexible display panel 240. This is because a point contacting with the chain structure 221 may vary while the curvature forming part forms a curvature in response to the folding mechanism of a pair of the bodies 211 and 212. In this case, there may be an effect that the chain structure 221 is sagged by the gravity in an unfolded state of a pair of the bodies 211 and 212. The present disclosure may include a pair of the support members 223 supporting the chain structure 221 to prevent the sagging effect of the chain structure 221.

A pair of the support members 223 of the present disclosure may be configured in a manner that one end portions thereof are fixed to a pair of the bodies 211 and 212, respectively and that the other end portions contact or cross with each other in the unfolded state of a pair of the bodies 211 and 212. Unlike the chain structure 221, a pair of the support members 223 are configured to maintain one planar state each and may require a space for rotation in response to the folding mechanism of a pair of the bodies 211 and 212. The space for a pair of the support members 223 to rotate therein may utilize a receiving space 225 formed by the hinge cover 224. Yet, the receiving space 225 formed by the hinge cover 224 may be insufficient as the space for a pair of the support members 223 to rotate therein. To enable a pair of the support members 223 to rotate without deviating from the receiving space 225, a pair of the support members 223 may include second elastic members 2231 provided to end portions of the support members 223, respectively. Namely, each of a pair of the support members 223 of the present disclosure may include the second elastic member 2231 having one end moving along a topside 2241 of the hinge member 224 and the other end elastically supported by a corresponding one of the bodies 211 and 212, in response to the folding mechanism of a pair of the bodies 211 and 212.

The mechanism of the support member 223 in response to the folding mechanism of a pair of the bodies 211 and 212 is described in detail as follows.

Figure 6:
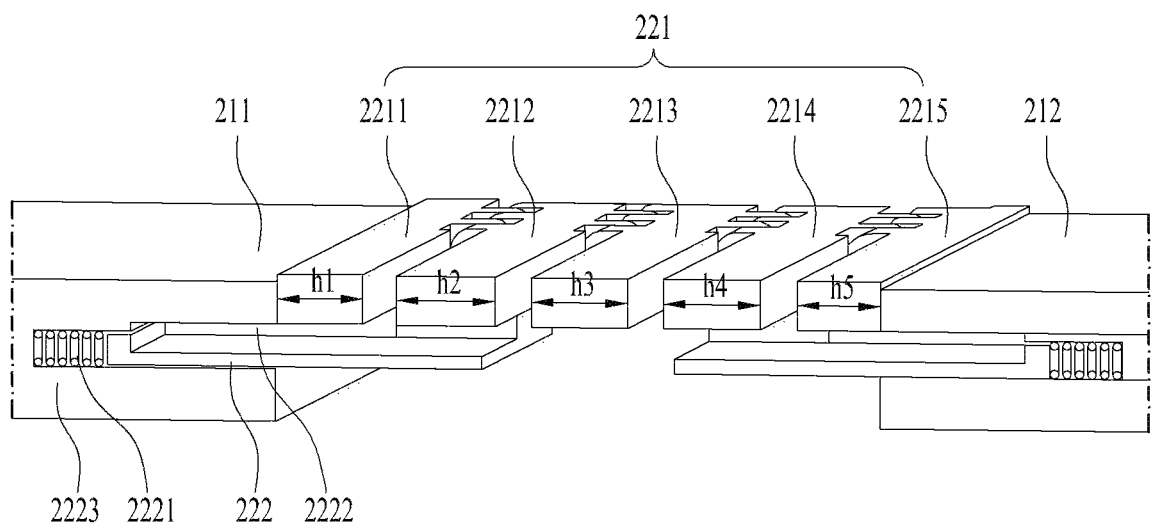
FIG. 6 and FIG. 7 are diagrams to describe the drive principle of a hinge part of a foldable mobile terminal related to the present disclosure.
Figure 6:
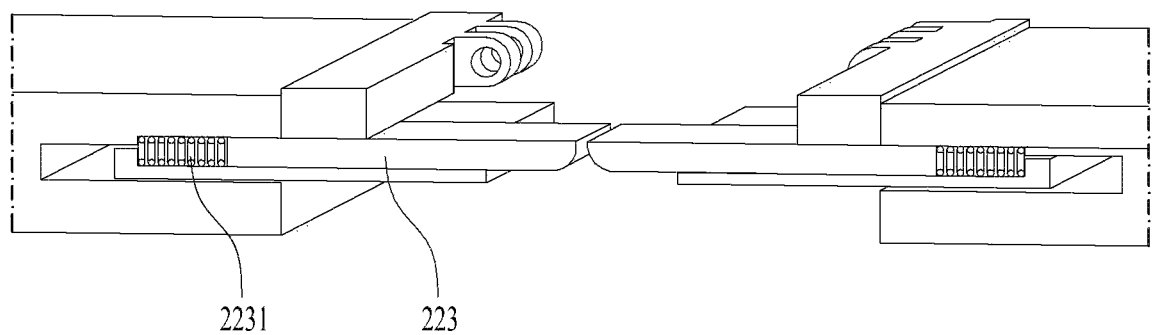
Figure 7:
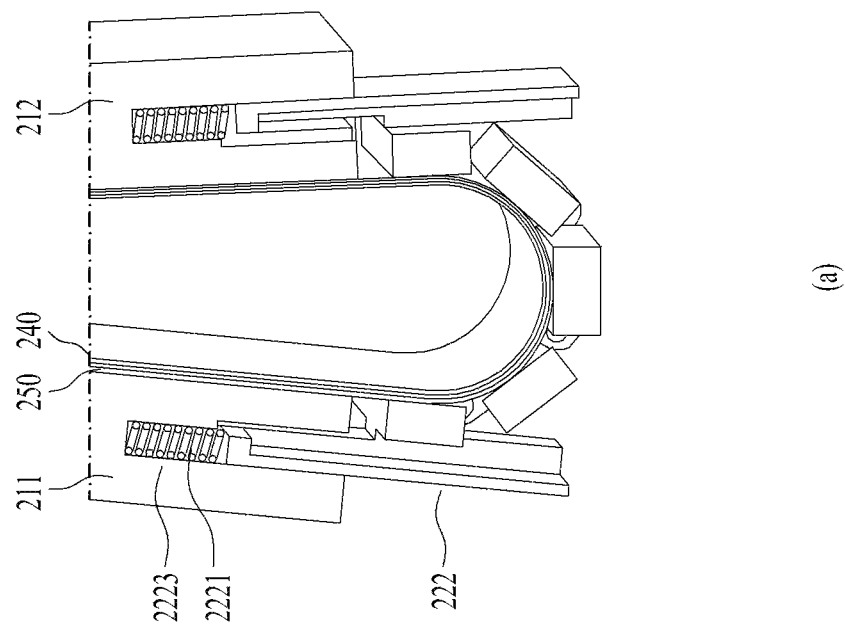
Figure 7:
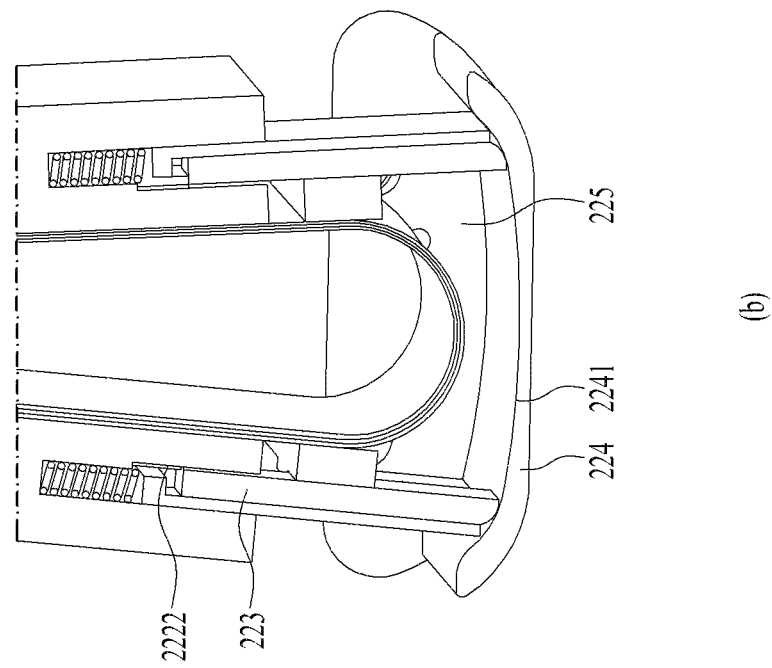

FIG. 6 and FIG. 7 are diagrams to describe the drive principle of a hinge part of a foldable mobile terminal related to the present disclosure.

The chain structure 221 of the present disclosure may be configured in a manner that a plurality of the components 2211 to 2215 are axially coupled to each other by having the same widths h1 to h5 each. The same widths h1 to h5 of a plurality of the components 2211 to 2215 may be advantageous in enabling the curvature forming part of the flexible display panel 240 to form a uniform curvature. Yet, in some cases, the components 2211 and 2215 provided to the most outer positions of the chain structure 221 may differ from the rest of the components 2212 to 2214 in width.

A pair of the sliding members 222 may be provided to the components 2211 and 2215 provided to the most outer positions, respectively. Preferably, a topside of the chain structure 221 of the present disclosure is flush with the topsides of a pair of the bodies. Therefore, a pair of the sliding members 222 are connected to the bottom sides of the components 2211 and 2215 provided to the most outer positions of the chain structure 221, thereby facing a pair of the bodies 211 and 212, respectively.

A pair of the sliding members 222 of the present disclosure may reciprocate along first guide grooves 2223 provided to a pair of the bodies 211 and 212 and may be elastically supported by the first elastic members 2221, respectively. In some cases, a pair of the sliding members 222 may be configured to be extended toward the adjacent components 2212 and 2214 by being fixed to the components 2211 and 2215 provided to the most outer positions, respectively. The above structure may be advantageous in supporting the chain structure 221. Yet, there may be limitation put on supporting the chain structure 221 completely using a pair of the sliding members 222. In case that a pair of the sliding members 222 are configured to contact or cross with each other in the unfolded state of a pair of the bodies 211 and 212, a more space is necessary for a pair of the sliding members 222 to rotate in response to the folding mechanism of a pair of the bodies 211 and 212. In this case, the receiving space 225 harmed by the hinge cover 224 may be insufficient. Yet, if a minimum curvature radius that can be formed by the flexible display panel 240 decreases, it may be possible to support the chain structure 221 using the sliding members 222.

The present disclosure may include a pair of the support members 223 to support the chain structure 221. A pair of the support members 223 of the present disclosure may be configured in a manner that one ends are fixed to a pair of the bodies in an unfolded state of a pair of the bodies 211 and 212 and that the other ends contact or cross with each other, respectively. A pair of the support members 223 may need a space for rotating in response to the folding mechanism of a pair of the bodies 211 and 212. The receiving space 225 provided by the hinge cover 224 may be insufficient for the space for a pair of the support members 223 to rotate therein. Accordingly, the present disclosure may reduce the space for a pair of the support members 223 to rotate therein in a manner of supporting end portions of a pair of the support members 223 with the second elastic members 2231, respectively and decreasing the protruding length thereof. Specifically, a pair of the support members 223 may be inserted in or withdrawn from the second guide grooves 2222 by being supported by the second elastic members 2231, respectively. The second guide groove 2222 may be provided to each of a pair of the bodies 211 and 212. In some cases, the second guide grooves 2222 may be provided to a pair of the sliding members 222 or to surfaces on which a pair of the sliding members 222 and a pair of the bodies 211 and 212 contact with each other, respectively.

Figure 8:
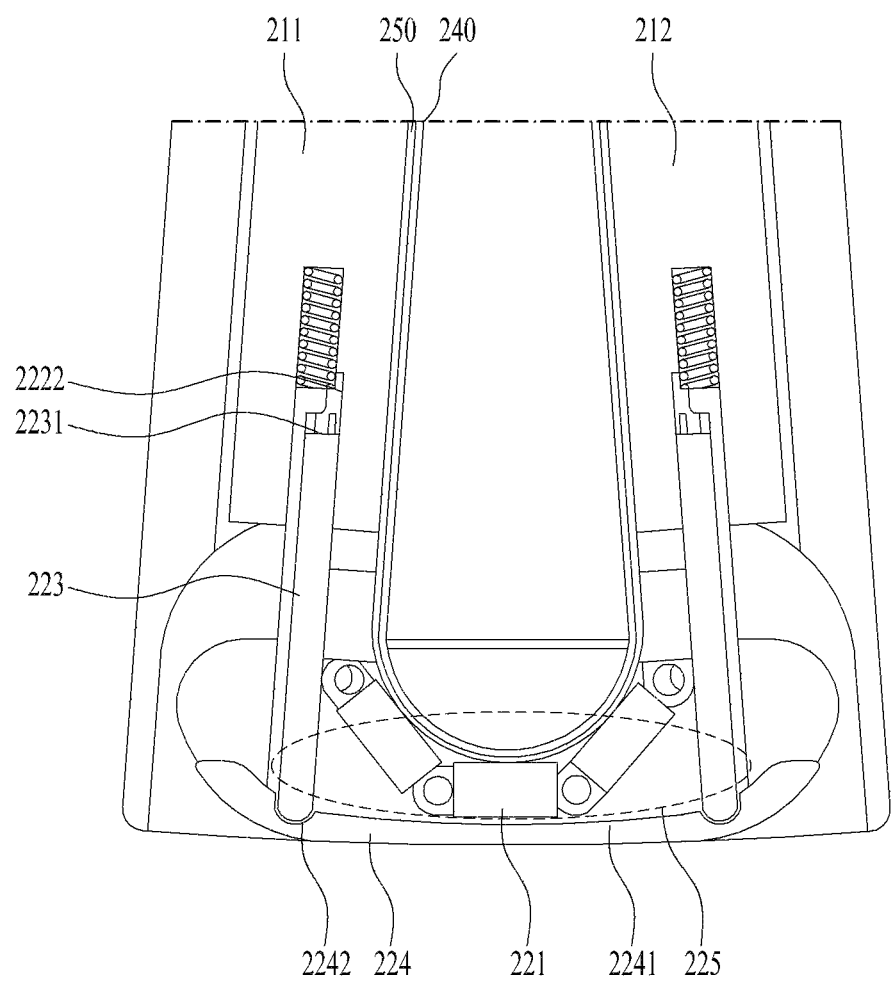
FIG. 8 is a diagram to describe a foldable mobile terminal according to another embodiment of the present disclosure.

FIG. 8 is a diagram to describe a foldable mobile terminal according to another embodiment of the present disclosure.

The present disclosure is characterized in supporting the curvature forming part of the flexible display panel 240 to form a uniform curvature radius using the restoring force of the elastic metal layer 250 and the chain structure 221 of the hinge part. Yet, due to the restoring force of the elastic metal layer 250, it may be difficult to maintain the folded state of a pair of the bodies 211 and 212.

The present disclosure may fix a pair of the bodies 211 and 212 to maintain the folded state using a pair of the support members 223. The hinge cover 224 of the present disclosure may include a pair of fixed recesses 2242 in which one ends of a pair of the support members 223 are inserted in the folded state of a pair of the bodies 211 and 212, respectively. Regarding a pair of the support members 223, one end may move along the topside 2241 of the hinge cover 224 in response to the folding mechanism of a pair of the bodies 211 and 212 and the other end may be inserted in or withdrawing from the second guide groove 2222 to correspond to the topside 2241 of the hinge cover 224. In case that a pair of the bodies 211 and 212 are fully folded, one ends of a pair of the support members 223 may be inserted in a pair of the fixed recesses 2242 provided to the topside 2241 of the hinge cover 224 and the other ends may be fixed to the folded state by being elastically supported by the second elastic members 2231, respectively.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A mobile terminal, comprising:
   a pair of bodies supporting a flexible display panel;
   a hinge part connecting the pair of bodies to perform a folding mechanism; and
   an elastic metal layer provided to a backside of the flexible display panel and passing through a curvature forming part corresponding to a region having the hinge part provided thereto in the flexible display panel,
   wherein the hinge part comprises:
   a chain structure formed in a manner that a plurality of components are axially-coupled continuously and support the curvature forming part through the chain structure; and
   a pair of sliding members adjusting a space between the chain structure and the pair of bodies in response to the folding mechanism of the pair of bodies.

2. The mobile terminal of claim 1, wherein the elastic metal layer supports the curvature forming part to form a uniform curvature radius in response to the folding mechanism of the pair of bodies.

3. The mobile terminal of claim 1, wherein the elastic metal layer has a restoring force corresponding to a minimum curvature radius formed by the curvature forming part.

4. The mobile terminal of claim 1, wherein the elastic metal layer comprises shape memory alloy or amorphous metal.

5. The mobile terminal of claim 1, wherein the elastic metal layer comprises Nitinol or Zr-based amorphous metal.

6. The mobile terminal of claim 1, wherein the plurality of components in the chain structure have a same width.

7. The mobile terminal of claim 6, wherein the chain structure supports the curvature forming part to form a uniform curvature radius through an external force provided by the elastic metal layer in response to the folding mechanism of the pair of bodies.

8. The mobile terminal of claim 1, wherein the pair of sliding members comprise first elastic members at end portions thereof so as to be elastically supported by the pair of bodies, respectively.

9. The mobile terminal of claim 1, wherein the hinge part further comprises a pair of support members supporting the chain structure in an unfolded state of the pair of bodies.

10. The mobile terminal of claim 9, wherein one ends of the pair of support members contact or cross with each other in the unfolded state of the pair of bodies.

11. The mobile terminal of claim 9, wherein the hinge part further comprises a hinge cover preventing the chain structure from being exposed in response to the folding mechanism of the pair of bodies and forming a receiving space having the curvature forming part inserted therein or withdrawn therefrom.

12. The mobile terminal of claim 11, wherein, to prevent the folding mechanism of the pair of bodies from being interrupted when one ends of the pair of support members contact with a topside of the hinge cover, the pair of support members comprise second elastic members provided to the other ends thereof so as to be elastically supported by the pair of bodies, respectively.

13. The mobile terminal of claim 11, wherein the hinge cover comprises fixed recesses having one ends of the pair of support members inserted therein, respectively in a folded state of the pair of bodies.

14. The mobile terminal of claim 9, wherein other ends of the pair of support members are disposed in the pair of bodies.

15. The mobile terminal of claim 1, wherein the plurality of components in the chain structure comprise:
   a plurality of inner components, each inner component contacting adjacent inner components or an adjacent outer component of the chain structure, and a plurality of outer components connected to the pair of bodies, wherein each of the plurality of inner components has a same width as each other, and wherein each of the plurality of outer components has a width that is different from the width of each of the plurality of inner components.

16. The mobile terminal of claim 15, wherein each of the plurality of outer components has a same width as each other.

17. The mobile terminal of claim 16, wherein each of the pair of sliding members is connected to a bottom side of one of the plurality of outer components.

18. The mobile terminal of claim 1, wherein the pair of bodies comprise a first body and a second body, wherein the pair of sliding members comprise a first sliding member and a second sliding member, and wherein a lengthwise direction of the first sliding member corresponds to a width direction of the first body, and a lengthwise direction of the second sliding member corresponds to a width direction of the second body.

* * * * *